United States Patent
Kimura et al.

(10) Patent No.: US 9,598,101 B2
(45) Date of Patent: Mar. 21, 2017

(54) STEERING ASSIST APPARATUS FOR VEHICLE

(71) Applicant: TOYOTA JIDOSHA KABUSHIKI KAISHA, Toyota-shi, Aichi-ken (JP)

(72) Inventors: Yukihide Kimura, Gotenba (JP); Yoji Kunihiro, Susono (JP); Takeshi Goto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/918,065

(22) Filed: Oct. 20, 2015

(65) Prior Publication Data

US 2016/0107679 A1    Apr. 21, 2016

(30) Foreign Application Priority Data

Oct. 21, 2014  (JP) ................................ 2014-214726
Oct. 16, 2015  (JP) ................................ 2015-204493

(51) Int. Cl.
  *B62D 5/04*  (2006.01)
(52) U.S. Cl.
  CPC ................................ *B62D 5/0463* (2013.01)
(58) Field of Classification Search
  CPC .............................. B62D 5/0463; B62D 5/046
  See application file for complete search history.

(56) References Cited

U.S. PATENT DOCUMENTS

2015/0274201 A1    10/2015    Kunihiro et al.

FOREIGN PATENT DOCUMENTS

| JP | 06-219312 A | 8/1994 |
| JP | 2004-175122 A | 6/2004 |
| WO | 2014/087546 A1 | 6/2014 |

*Primary Examiner* — Michael D Lang
(74) *Attorney, Agent, or Firm* — Sughrue Mion, PLLC (57) ABSTRACT

Provided is a steering assist apparatus (10) for a vehicle, including a transmission device (22) configured to transmit a force and a displacement relating to steering between a steering wheel (18) and steered wheels (20L, 20R), a power steering device (12) configured to apply an assist torque to the transmission device, and a control device (50). When assuming the steering wheel, the transmission device, the power steering device, and the steered wheels as a steering system, the control device is configured to calculate, based on a product of a steering angular velocity and a derivative of the steering angular velocity, a product of the steering angular velocity and a steering torque, and a product of a steering angle and a derivative of the steering torque, a change rate (dDE) of an energy of the steering system, and control the assist torque based on the change rate of the energy of the steering system.

8 Claims, 9 Drawing Sheets

STEERING ASSIST APPARATUS FOR VEHICLE

BACKGROUND OF THE INVENTION

1. Field of the Invention

The present invention relates to a steering assist apparatus for a vehicle, and more particularly, to a steering assist apparatus configured to adjust a force relating to steering, to thereby assist the steering.

2. Description of the Related Art

In a vehicle such as a motor vehicle, a steering assist apparatus configured to adjust a force relating to steering, such as a steering assist force, to thereby assist the steering is generally installed. The steering assist apparatus of this type is desirably configured to not only simply reduce a steering load on a driver, but also adjust the force relating to the steering so as to reflect an intention of the driver.

For example, in International Patent WO2014/087546A filed by the applicant of the present invention, there is described a steering assist apparatus configured to calculate a steering power, and changing the adjustment of the force relating to the steering depending on whether or not a magnitude of the steering power is larger than a reference. In particular, the steering power is calculated as a sum of a product of a steering angular velocity and a steering torque and a product of a steering angle and a derivative of the steering torque. The steering assist apparatus described in International Patent WO2014/087546A can adjust the force relating to the steering so as to suitably reflect the intention of the driver compared with a case in which the magnitude of the steering power is not considered.

However, even when the determination is made as to whether or not the magnitude of the steering power is larger than the reference based on the configuration described in International Patent WO2014/087546A, in some cases, the adjustment of the force relating to the steering cannot be appropriately changed depending on a steering state.

For example, even when the steering is started under a state in which the steering wheel is in a neutral area (a straight traveling position of the vehicle and a neighborhood thereof), the steering torque is not generated immediately, and the magnitude of the steering power is very small in a steering area in which a steering extent with respect to the neutral position is small. Therefore, even when the determination is made as to whether or not the magnitude of the steering power is larger than the reference under the state in which the steering wheel is in the neutral area, the power relating to the steering cannot be appropriately changed depending on the steering state.

Moreover, when the driver rotates the steering wheel in a neutral area while resisting a self-aligning torque, an appropriate resisting force or attenuation force is preferably applied to the rotation of the steering wheel so that the driver can stably carry out the steering operation. In contrast, when the steering wheel is rotated in a neighborhood area of the neutral position toward the neutral position by the self-aligning torque, the resisting force against the rotation of the steering wheel is preferably small so that the steering wheel quickly returns to the neutral position.

However, when the steering wheel is rotated in a neighborhood area of the neutral position toward the neutral position, the configuration described in International Patent WO2014/087546A cannot determine whether the rotation of the steering wheel is caused by the operation of the driver or the self-aligning torque. Thus, the resisting force against the steering and the like cannot be appropriately changed depending on the steering state. Moreover, in order to distinguish the above-mentioned states from each other, it is necessary to determine whether or not a state in which the driver has released the steering wheel, namely, a hands-free state exists.

Further, when the steering wheel is rotated by the steering operation of the driver as well as the force received by the steered wheels from a road surface, such as the self-aligning torque, and the rotation directions thereof are the same, the steering torque results in a low value. Therefore, the magnitude of the steering power is very small, and hence even when the determination is made as to whether or not the magnitude of the steering power is larger than the reference, the adjustment of the force relating to the steering cannot be appropriately changed depending on the steering state.

SUMMARY OF THE INVENTION

The present invention has been made in view of the above-mentioned problems of the steering assist apparatus described in International Patent WO2014/087546A, and therefore has a primary object to provide a steering assist apparatus improved in terms of the above-mentioned problems.

According to one embodiment of the present invention, there is provided a steering assist apparatus for a vehicle, which is to be applied to the vehicle including a steering device, the steering device including: a steering wheel to be operated by a driver; steered wheels; and a transmission device configured to transmit a force and a displacement relating to steering between the steering wheel and the steered wheel, the steering assist apparatus including: an adjustment force applying device configured to apply an adjustment force for adjusting a force relating to the steering to the transmission device; a control device configured to control the adjustment force to be applied by the adjustment force applying device to the transmission device; a steering angle detection device configured to detect a steering angle; and a steering torque detection device configured to detect a steering torque, in which the control device is configured to acquire a steering angular velocity, a derivative of the steering angular velocity, and a derivative of the steering torque, calculate, assuming the steering wheel, the transmission device, the adjustment force applying device, and the steered wheel as a steering system, a change rate of an energy of the steering system based on a product of the steering angular velocity and the derivative of the steering angular velocity, a product of the steering angular velocity and the steering torque, and a product of the steering angle and the derivative of the steering torque, and control the adjustment force based on the change rate of the energy of the steering system.

According to the above-mentioned configuration, the change rate of the energy of the steering system is calculated based on the product of the steering angular velocity and the derivative of the steering angular velocity, the product of the steering angular velocity and the steering torque, and the product of the steering angle and the derivative of the steering torque, and the adjustment force is controlled based on the change rate of the energy of the steering system. The change rate of the energy of the steering system represents direction and degree in which the energy is input to the steering system, and hence the adjustment force may be controlled depending on the direction and degree in which the energy is input to the steering system. As described in detail hereinafter, based on whether the change rate of the energy of the steering system is an increasing change rate and is large or the change rate is a decreasing change rate and is large is large in magnitude, it is possible to determine whether a state in which the energy is input to the steering system is a state of a forward input by steering by a driver or a state of a reverse input by reception of a force by the steered wheel from a road surface.

In particular, the change rate of the energy of the steering system is calculated based on the product of the steering angular velocity and the derivative of the steering angular velocity. The steering angular velocity and the derivative of the steering angular velocity change greatly than the steering torque and the derivative thereof even when the steering is started while the steering wheel is in the neutral area. Thus, compared with the determination based on the steering power described in International Patent WO2014/087546A, which does not include the product of the steering angular velocity and the derivative of the steering angular velocity, the adjustment force may be appropriately controlled depending on the steering state while the steering wheel is in the neutral area.

Moreover, a state in which the steering wheel rotates may be determined earlier than in a case where the steering angular velocity and the derivative of the steering angular velocity are not considered. Thus, for example, when the driver starts to carry out a quick steering operation, the forward input state may be determined earlier to control the adjustment force, and consequently, the steering by the driver may be efficiently assisted. Moreover, when the driver releases the hands from the steering wheel at an end of a turn, and the steering wheel is returned to the neutral position in a neighborhood area of the neutral position by the self-aligning torque, the reverse input state may be determined earlier and the adjustment force may be controlled so that the resisting force against the rotation of the steering wheel is small. Moreover, in this case, whether or not the state in which the steering wheel is released exists does not need to be determined.

Further, when the steering wheel is rotated (forward input) by the steering operation by the driver as well as rotated (reverse input) by the force received by the steered wheel from the road surface, and the rotation directions thereof are the same, the steering torque results in a low value, but the steering wheel still rotates. According to the above-mentioned configuration, as a product of a steering angular velocity and a derivative of the steering angular velocity is considered, the above-mentioned same directional rotation state may be determined, and hence even when the forward input and the reverse input to the steering system are in the same phase, the adjustment force may be controlled.

In the above-mentioned configuration, the control device may be configured to calculate, as the change rate of the energy of the steering system, a derivative of a sum of a product of a yaw moment of inertia that is based on a mass of a movable member constructing the steering system and including at least the steering wheel, the steering angular velocity, and the derivative of the steering angular velocity, the product of the steering angular velocity and the steering torque, and the product of the steering angle and the derivative of the steering torque.

According to the above-mentioned configuration, as described in detail later, the change rate of the energy of the steering system may be calculated as a sum of a rotational energy and an elastic energy respectively corresponding to an internal energy and a PV work in the enthalpy theory of the thermodynamics. Thus, the inflow/outflow of the energy to/from the steering system, i.e., whether the change rate of the energy of the steering system is a state of a forward input or a state of a reverse input may be precisely determined.

Further, in the above-mentioned configuration, the adjustment force may be a steering assist force, and the control device may be configured to increase, when the change rate of the energy of the steering system is an increasing change rate, the steering assist force compared with a case in which the change rate of the energy of the steering system is not the increasing change rate.

According to the above-mentioned configuration, when the change rate of the energy of the steering system is a increasing change rate and, accordingly, the energy flows into the steering system, the steering assist force may be increased compared with a case in which the change rate of the energy of the steering system is not a increasing change rate. Thus, when the driver is carrying out the steering operation, the assist for the steering operation by the driver is increased by the increase correction to the steering assist force, thereby facilitating the steering operation by the driver.

In the above-mentioned configuration, the adjustment force may be at least one of a steering attenuation force or a steering friction force, and the control device may be configured to increase, when the change rate of the energy of the steering system is a decreasing change rate, at least one of the steering attenuation force or the steering friction force compared with a case in which the change rate of the energy of the steering system is not the decreasing change rate.

According to the above-mentioned configuration, when the change rate of the energy of the steering system is a decreasing change rate, at least one of the steering attenuation force or the steering friction force may be increased compared with a case in which the change rate of the energy of the steering system is not a decreasing change rate. Thus, when the driver is not carrying out the steering operation, at least one of the steering attenuation force or the steering friction force is corrected to increase, and hence a degree of rotation of the steering wheel caused by an interference received by the steered wheel may be reduced, to thereby increase stability of the steering.

Further, in the above-mentioned configuration, the control device may be configured to determine whether a state in which the energy is input to the steering system is a state of a forward input by steering by a driver or a state of a reverse input by reception of a force by the steered wheel from a road surface, and change an amount of correction to the steering assist force so that an amount of correction to the steering assist force in a state of a reverse input is smaller in magnitude than an amount of correction to the steering assist force in a state of a forward input.

According to the above-mentioned configuration, as the steering assist force is controlled based on both the change rate of the energy of the steering system and a state in which the energy is input to the steering system, the steering assist force may be controlled more appropriately compared with a case in which a state in which the energy is input to the steering system is not considered. That is, when a state in which the energy is input to the steering system is a state of a forward input by steering by a driver, an amount of correction to the steering assist force may be reduced in magnitude compared with a case in which the state is a reversed input, which enables to reduce a possibility of excessive steering assist force.

Further, in the above-mentioned configuration, the control device may be configured to determine whether a state in which the energy is input to the steering system is a state of a forward input by steering by a driver or a state of a reverse input by reception of a force by the steered wheel from a road surface, and change an amount of correction to at least one of the steering attenuation force or the steering friction force so that an amount of correction to at least one of the steering attenuation force or the steering friction force in a state of a reverse input is larger in magnitude than an amount of correction to at least one of the steering attenuation force or the steering friction force in a state of a forward input.

According to the above-mentioned configuration, as the steering assist force is controlled based on both the change rate of the energy of the steering system and a state in which the energy is input to the steering system, at least one of the steering attenuation force or the steering friction force may be controlled more appropriately compared with a case in which a state in which the energy is input to the steering system is not considered. That is, an amount of correction to at least one of the steering attenuation force or the steering friction force in a state of a reverse input is larger in magnitude than an amount of correction to at least one of the steering attenuation force or the steering friction force in a state of a forward input. Thus, in a state of a reverse input, at least one of the steering attenuation force or the steering friction force may further be increased than in a state of a forward input, which enables to reduce more positively the possibility of rotation of the steering wheel caused by an interference received by the steered wheel.

Further, in the above-mentioned configuration, the control device may be configured to determine, based on a product of the steering torque, the derivative of the steering torque, and the change rate of the energy of the steering system, whether the state in which the energy is input to the steering system is the state of the forward input by the steering by the driver or the state of the reverse input by the reception of the force by the steered wheel from the road surface.

According to the above-mentioned configuration, the change rate of the energy of the steering system, and the steering torque and the derivative of the steering torque used for the calculation thereof may be used to determine whether the state in which the energy is input to the steering system is the forward input or the reverse input. Moreover, special devices for determining the input direction, such as two torque sensors, are not necessary.

DETAILED DESCRIPTION OF THE PREFERRED EMBODIMENTS

[First embodiment]

Figure 1:
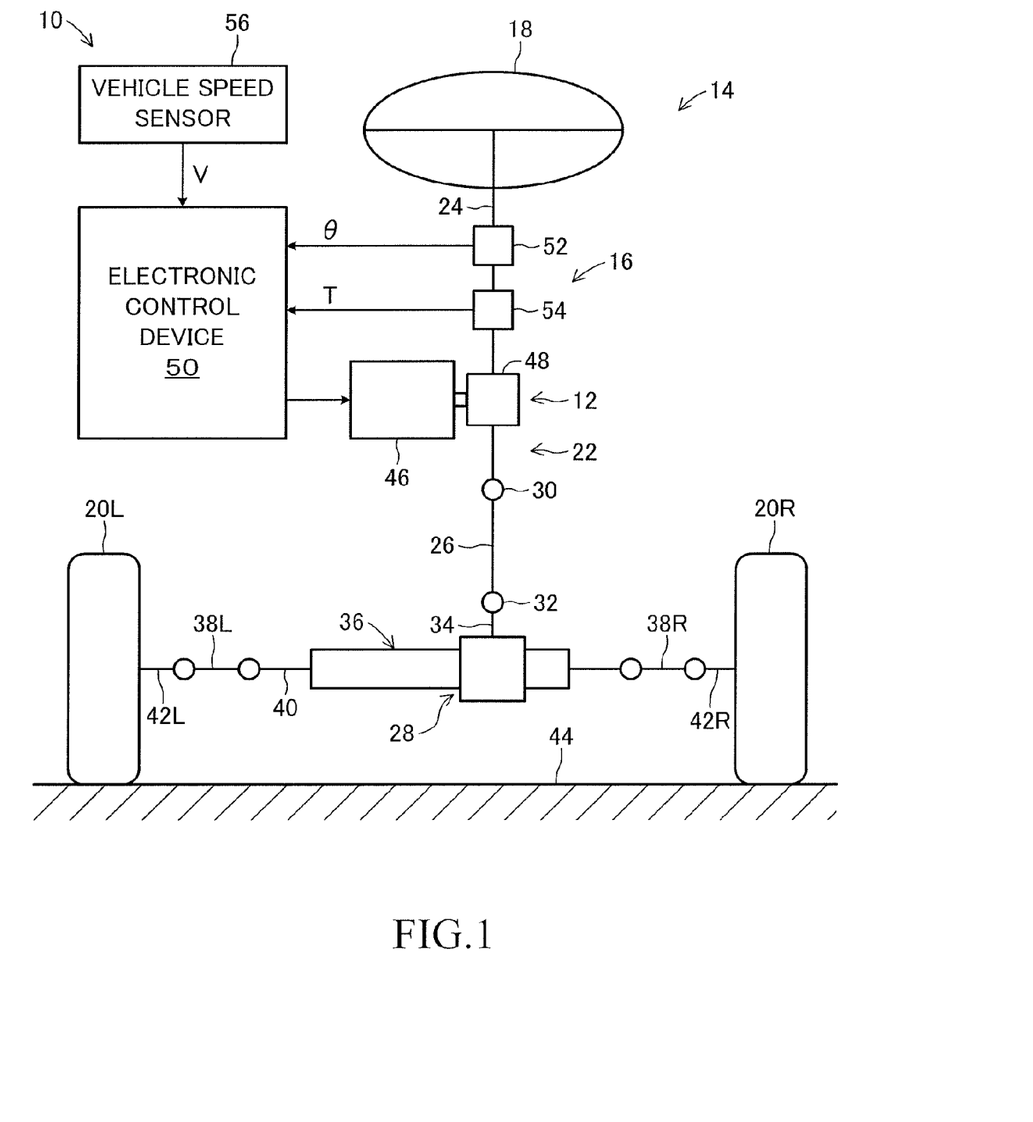
FIG. 1 is a diagram for illustrating an overview of a steering assist apparatus for a vehicle according to a first embodiment of the present invention.

FIG. 1 is an explanatory diagram for illustrating an overview of a steering assist apparatus 10 for a vehicle according to a first embodiment of the present invention. The steering assist apparatus 10 according to this embodiment is applied to a vehicle 14 on which a column assist type electric power steering device (EPS) 12 is installed. Note that, the electric power steering device may be a power steering device of another type such as a rack assist type electric power steering device with its motor coaxial with a rack as long as an assist torque can be controlled.

In FIG. 1, the vehicle 14 includes a steering device 16, which is a steering system for the vehicle 14. The steering device 16 includes a steering wheel 18 to be operated by a driver, front left and right wheels 20L and 20R, which are steered wheels, and a transmission device 22 configured to transmit a force and a displacement relating to the steering between the steering wheel 18 and the front wheels 20L and 20R. The transmission device 22 includes an upper steering shaft 24 configured to rotate along with the steering wheel 18, an intermediate shaft 26, and a steering mechanism 28. The intermediate shaft 26 is coupled to a bottom end of the upper steering shaft 24 at its top end via a universal joint 30, and is coupled to a pinion shaft 34 of the steering mechanism 28 at its bottom end via a universal joint 32.

The steering mechanism 28 includes a steering unit 36 of the rack-and-pinion type, and tie rods 38L and 38R. The steering unit 36 converts a rotation of the pinion shaft 34 into a translational motion in a vehicle lateral direction of a rack bar 40, and also converts the rotation of the pinion shaft 34 in an opposite direction. The tie rods 38L and 38R are pivotally connected to tips of the rack bar 40 at its inner ends. The tie rods 38L and 38R are pivotally connected, at its outer ends, to knuckle arms 42L and 42R provided to carriers (not shown) for the front left and right wheels 20L and 20R.

Thus, the rotational displacement and the rotational torque of the steering wheel 18 are converted by the transmission device 22 into swings and rotational torques about kingpin axes (not shown) of the front wheels 20L and 20R, and then are transmitted to the front wheels 20L and 20R.

Moreover, swings and rotational torques about the kingpin axes received by the front left and right wheels 20L and 20R from a road surface 44 are transmitted by the transmission device 22 to the steering wheel 18 as a rotational displacement and a rotational torque, respectively.

The steering assist apparatus 10 includes an electric power steering device 12. The power steering device 12 includes a motor 46 and a conversion device 48. The conversion device 48 includes a warm gear fixed to a rotational shaft of the motor 46 and a warm wheel fixed to the upper steering shaft 24, which are not shown in FIG. 1. A rotational torque of the motor 46 is converted by the conversion device 48 into a rotational torque about the upper steering shaft 24, and is transmitted to the upper steering shaft 24. Thus, the power steering device 12 functions as an adjustment force applying device configured to apply an assist torque, which serves as an adjustment force for adjusting a force relating to the steering, to the upper steering shaft 24 of the transmission device 2.

Moreover, the steering assist apparatus 10 includes an electronic control device 50. The electronic control device 50 functions as a control device configured to control the rotational torque of the motor 46, to thereby control the assist torque applied by the power steering device 12 to the upper steering shaft 24 as described in detail later. Signals representing a steering angle 8 and a steering torque T are input to the electronic control device 50 respectively from a steering angle sensor 52 and a torque sensor 54 provided to the upper steering shaft 24. Moreover, a signal representing a vehicle speed V is also input to the electronic control device 50 from a vehicle speed sensor 56.

The electronic control device 50 includes a microcomputer including a CPU, a ROM, a RAM, and an input/output port device mutually connected to one another via a bidirectional common bus. The ROM may store control programs, maps, and the like described later. Moreover, the steering angle sensor 52 and the torque sensor 54 respectively detect the steering angle θ and the steering torque T, which are defined to be positive when the vehicle is steered toward a left turn direction.

Figure 2:
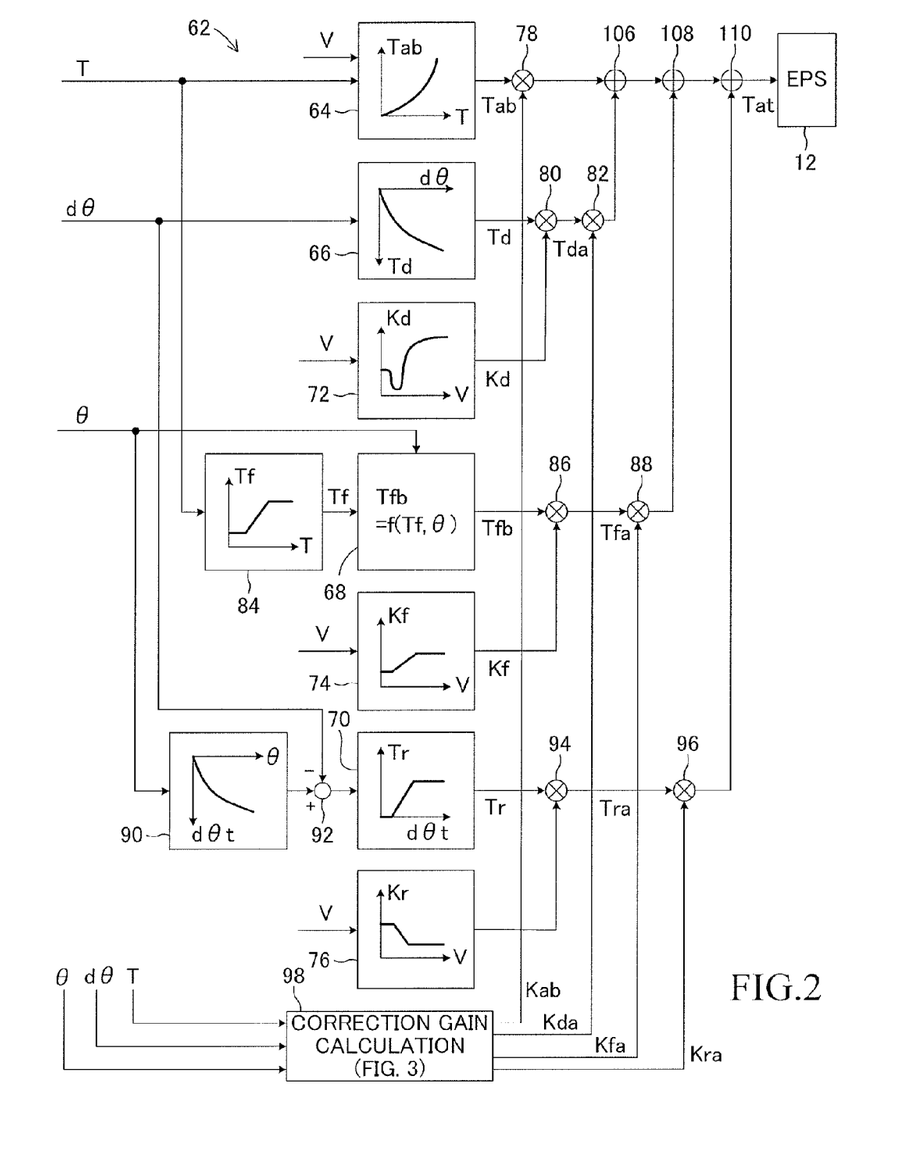
FIG. 2 is a block diagram of an assist torque calculation device configured to calculate an assist torque Ta according to the first embodiment.
Figure 3:
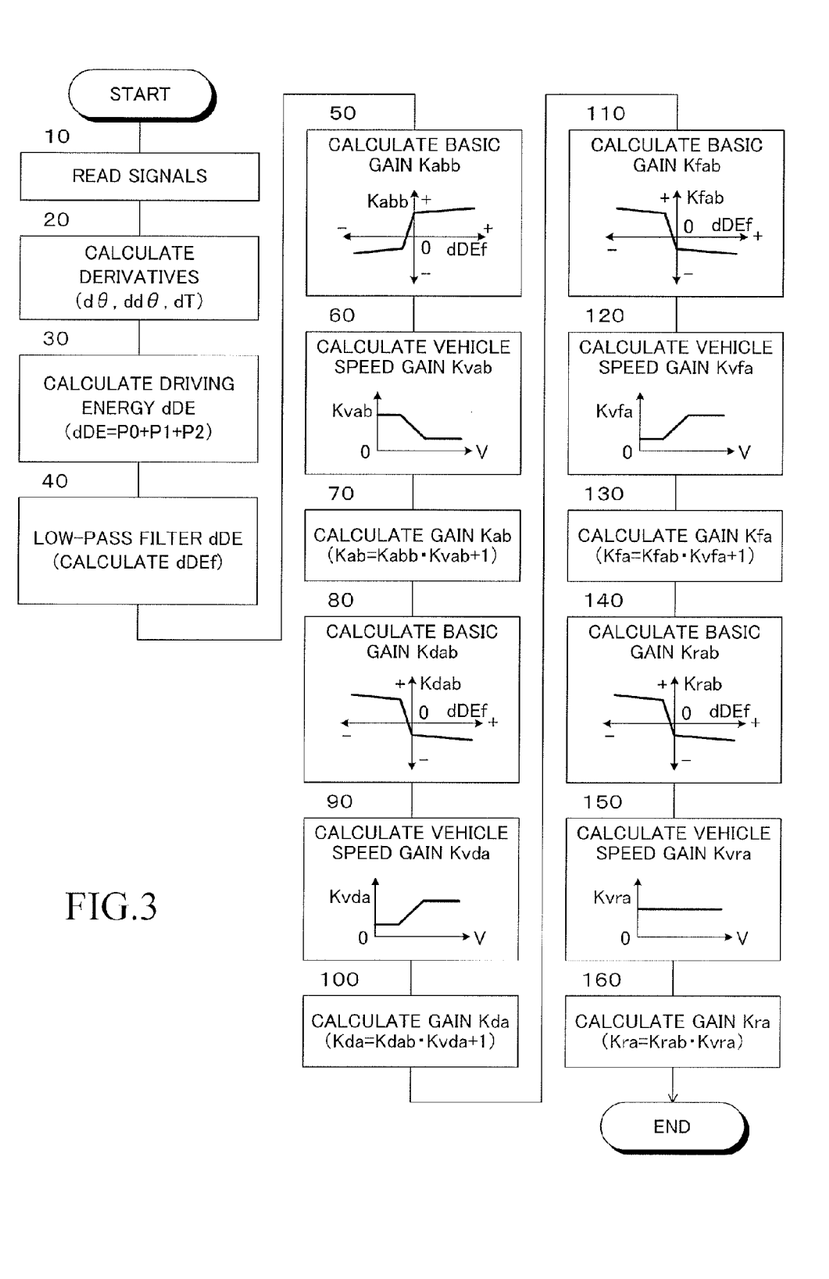
FIG. 3 is a flowchart for illustrating calculation of a correction gain by a correction gain calculation block illustrated in FIG. 2.

The microcomputer of the electronic control device 50 functions as an assist torque calculation device 62 configured to calculate a target assist torque Tat in accordance with a block diagram illustrated in FIG. 2 and a flowchart illustrated in FIG. 3 based on the steering angle θ, the steering torque T, and the vehicle speed V.

First, a description is given of the block diagram illustrated in FIG. 2. In a graph of each block illustrated in FIG. 2, a map used for calculation in the corresponding block is schematically shown.

The assist torque calculation device 62 calculates a target assist torque Tat as a sum of a basic assist torque, an attenuation control amount, a friction control amount, and a return control amount for returning the steering wheel 18 to the neutral position. The assist torque calculation device 62 includes a basic assist torque calculation block 64, an attenuation control amount calculation block 66, a friction control amount calculation block 68, and a return control amount calculation block 70. Moreover, the assist torque calculation device 62 includes an attenuation control amount gain calculation block 72, a friction control amount gain calculation block 74, and a return control amount gain calculation block 76.

The basic assist torque calculation block 64 calculates a basic assist torque Tab based on the steering torque T and the vehicle speed V so as to increase in magnitude as a magnitude of the steering torque T increases, and so as to decrease as the vehicle speed V increases. A signal representing the basic assist torque Tab is output to a multiplier 78.

The attenuation control amount calculation block 66 calculates an attenuation control amount Td based on a derivative dθ (steering angular velocity) of the steering angle so as to increase in magnitude as a magnitude of the derivative dθ of the steering angle θ increases. The attenuation control amount gain calculation block 72 calculates an attenuation control amount gain Kd based on the vehicle speed V so as to be smaller in a low speed range than in a micro-low speed range, and to increase as the vehicle speed V increases in medium and high speed ranges. A signal representing the attenuation control amount Td and a signal representing the attenuation control amount gain Kd are output to a multiplier 80. A signal representing a product Td·Kd of the attenuation control amount Td and the attenuation control amount gain Kd calculated by the multiplier 80 is output to a multiplier 82 as a corrected attenuation control amount Tda.

A signal representing a friction torque Tf calculated based on the steering torque T by a friction torque calculation block 84 and a signal representing the steering angle θ are input to the friction control amount calculation block 68. The friction control amount calculation block 68 calculates a basic friction control amount Tfb based on the friction torque Tf and the steering angle θ. The friction control amount gain calculation block 74 calculates a friction control amount gain Kf based on the vehicle speed V so as to increase as the vehicle speed V increases in the low and medium speed ranges, and so as to be a constant value in the high speed range. A signal representing the basic friction control amount Tfb and a signal representing the friction control amount gain Kf are output to a multiplier 86, and a signal representing a product Tfb·Kf of the basic friction control amount Tfb and the friction control amount gain Kf calculated by the multiplier 86 is output to a multiplier 88 as a corrected friction control amount Tfa.

Note that, the friction torque Tf is a torque acting as a friction drag against the steering operation by the driver, and may be calculated in a manner described, for example, in Japanese Patent Application Laid-open No. 2009-126244 A filed by the applicant of the present invention.

A signal representing a deviation Δdθ of the steering angular velocity is input to the return control amount calculation block 70. The deviation Δdθ of the steering angular velocity is calculated by an adder 92 subtracting the steering angular velocity dθ from the target steering angular velocity dθt calculated based on the steering angle e by the target steering angular velocity calculation block 90. The return control amount calculation block 70 calculates a return control amount Tr based on the deviation Me of the steering angular velocity so as to increase in magnitude as a magnitude of the deviation Δdθ of the steering angular velocity increases. The return control amount gain calculation block 76 calculates a return control amount gain Kr based on the vehicle speed V so as to increase as the vehicle speed V increases in the low and medium speed ranges, and so as to be a constant value in the high speed range. A signal representing the return control amount Tr and a signal representing the return control amount gain Kr are output to a multiplier 94. A signal representing a product Tr·Kr of the return control amount Tr and the return control amount gain Kr calculated by the multiplier 94 is output to a multiplier 96 as a corrected return control amount Tra.

Note that, in FIG. 2, in the maps of the blocks 64, 66, 70, 84, and 90, values to be calculated such as the basic assist torque Tab are shown only for positive values of the variables such as the steering torque T. However, values to be calculated for negative values of the variables are point-symmetric to the shown values with respect to the origin.

Further, the assist torque calculation device 62 includes a correction gain calculation block 98 for calculating a change rate dDE of the driving energy for the steering device 16, and calculating a correction gain for the basic assist torque Tab and the like based on the change rate dDE. The change rate dDE of the driving energy is a value calculated based on a model 100 of the steering device 16 (steering system) illustrated in FIG. 7.

Figure 7:
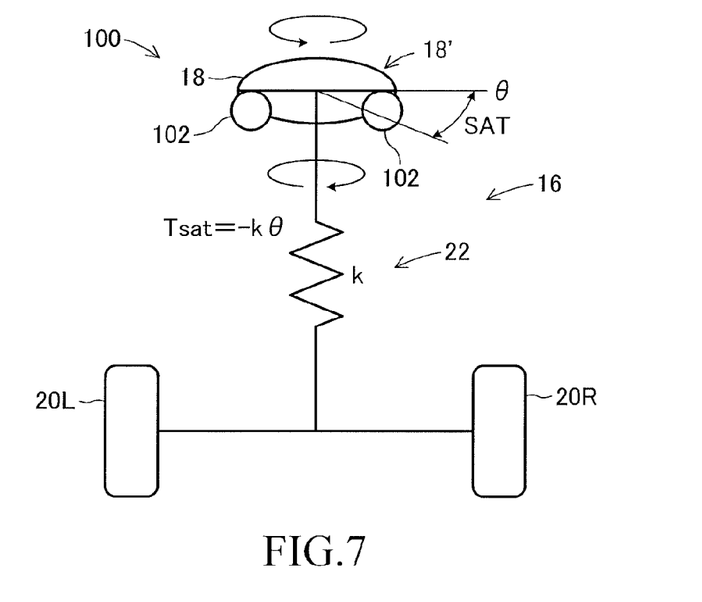
FIG. 7 is a diagram for illustrating a model of a steering device configured to calculate a change rate dDE of a driving energy.

As illustrated in FIG. 7, in the model 100, hands 102 of the driver and the steering wheel 18, which is a rigid body, are considered as a steering wheel 18'. Moreover, it is assumed that the mass of principal movable members of the steering device 16 are concentrated to the steering wheel 18', and a yaw moment of inertia of the steering wheel 18' is I. Further, the steering device 16 other than the steering wheel 18 is considered as an elastic body that has a spring constant k of torsional deformation and does not have a mass.

The driving energy DE of the model 100, i.e., the energy which the model 100 holds, is considered as a sum of a rotational energy and an elastic energy respectively corresponding to an internal energy and a PV work in the enthalpy theory of the thermodynamics. Thus, the driving energy DE of the model 100 is represented by Expression (1) where dθ is the derivative of the steering angle θ, which is a rotational angle of the steering wheel 18'.

$$DE = \frac{1}{2} I \cdot d\theta^2 + \frac{1}{2} k \cdot \theta^2 \tag{1}$$

When a torque generated as a result of the force from the steering wheel side rotating the upper end of the transmission device 22 by an angle θ, namely, rotating the end on the steering wheel 18' side by an angle θ, is represented as Tsat, the torque Tsat is represented by Expression (2).

$$Tsat = -k \cdot \theta \tag{2}$$

Thus, the driving energy DE of the model 100 is represented by Expression (3) from Expressions (1) and (2).

$$DE = \frac{1}{2} I \cdot d\theta^2 + \frac{1}{2} (-Tsat)^2 \tag{3}$$

An inflow and an outflow of energy to and from the model 100, namely, a change in the driving energy DE of the model 100, can be determined based on the sign of a derivative thereof. When a second derivative of the steering angle is represented as ddθ, the derivative of the driving energy DE, namely, a change rate dDE, can be represented by Expression (4) through differentiation of Expression (3).

$$dDE = I \cdot d\theta \cdot dd\theta + \frac{1}{2}(-dTsat)\theta + \frac{1}{2}(-Tsat)d\theta \tag{4}$$

The sign of the steering torque T is opposite to the sign of the torque Tsat, namely, −Tsat=T. Thus, when the derivative of the steering torque T is represented as dT, Expression (4) can be rewritten into Expression (5). A first term, a second term, and a third term of Expression (5) are respectively referred to as P0 term, P1 term, and P2 term as necessary.

$$dDE = I \cdot d\theta \cdot dd\theta + \frac{1}{2} T \cdot d\theta + \frac{1}{2} dT \cdot \theta \tag{5}$$

The correction gain calculation block 98 calculates a correction gain for each control amount in accordance with the flowchart illustrated in FIG. 3. Note that, in a graph of a box of each step illustrated in FIG. 3, a map used for calculation in the corresponding step is schematically shown. It should be noted that the control according to the flowchart illustrated in FIG. 3 is repeatedly executed every predetermined time by the electronic control device 50 while the ignition switch ON. The same goes for the control according to the flowcharts illustrated in FIGS. 5 and 6 for the second embodiment described later.

First, in Step 10, the signal representing the steering angle detected by the steering angle sensor 52 and the like are read. In Step 20, the derivative dθ of the steering angle θ, the second-order derivative ddθ of the steering angle θ, and the derivative dT of the steering torque T are calculated. Note that, the derivative dB of the steering angle θ may be a value detected as a steering angular velocity, and the second-order derivative ddθ of the steering angle may be calculated as a derivative of the detected steering angular velocity dθ.

In Step 30, the change rate dDE of the driving energy DE is calculated in accordance with Expression (5). Note that, the yaw moment of inertia I in the calculation of the change rate dDE may not be a value reflecting the mass of the hands of the driver and all of the movable members of the steering device 16. For example, the yaw moment of inertia I may be a value based on the masses of the hands of the driver and the steering wheel 18, or a value based on the masses of the hands of the driver, the steering wheel 18, and the rotational members (such as the upper steering shaft 24 and the intermediate shaft 26).

In Step 40, the change rate dDE of the driving energy DE is low-pass filtered to calculate a change rate dDEf of the driving energy after low-pass filtering with its high frequency noise components removed.

In Step 50, based on the change rate dDEf of the driving energy after the low-pass filtering, a basic gain Kabb for the basic assist torque Tab is calculated. In this case, the basic gain Kabb is calculated as a positive value (equal to or smaller than 1) so as to increase as the change rate dDEf increases when the change rate dDEf is positive. Conversely, when the change rate dDEf is equal to or smaller than a negative reference set in advance, the basic gain Kabb is calculated as a negative value (equal to or larger than −1) whose absolute value increases as the change rate dDEf decreases. Further, when the change rate dDEf is larger than the negative reference and equal to or smaller than 0, the basic gain Kabb is calculated so as to increase as the change rate dDEf increases.

Note that, when the change rate dDEf is positive, the basic gain Kabb may be calculated as a positive constant value equal to or smaller than 1. Moreover, when the change rate dDEf is equal to or smaller than the negative reference set in advance, the basic gain Kabb may be calculated as a negative constant value equal to or larger than −1.

In Step 60, a vehicle speed gain Kvab for the basic assist torque Tab is calculated as a positive value (equal to or smaller than 1) based on the vehicle speed V so as to decrease as the vehicle speed V increases.

In Step 70, a correction gain Kab for the basic assist torque Tab is calculated as a sum (Kabb·Kvab+1) of a product of the basic gain Kabb and the vehicle speed gain Kvab and 1.

In Step 80, based on the change rate dDEf of the driving energy after the low-pass filtering, a basic gain Kdab for the corrected attenuation control amount Tda is calculated. In this case, the basic gain Kdab is calculated as a negative value (equal to or larger than −1) whose absolute value increases as the change rate dDEf increases when the change rate dDEf is positive. Conversely, when the change rate dDEf is equal to or smaller than a negative reference set in advance, the basic gain Kdab is calculated as a positive value (equal to or smaller than 1) so as to increase as the change rate dDEf decreases. Further, when the change rate dDEf is larger than the negative reference and equal to or smaller than 0, the basic gain Kdab is calculated so as to decrease as the change rate dDEf increases.

In Step 90, a vehicle speed gain Kvda for the corrected attenuation control amount Tda is calculated as a positive value (equal to or smaller than 1) based on the vehicle speed V so as to increase as the vehicle speed V increases.

In Step 100, a correction gain Kda for the corrected attenuation control amount Tda is calculated as a sum (Kdab·Kvda+1) of a product of the basic gain Kdab and the vehicle speed gain Kvda and 1.

In Step 110, based on the change rate dDEf of the driving energy after the low-pass filtering, a basic gain Kfab for the corrected friction control amount Tfa is calculated. In this case, the basic gain Kfab is calculated as a negative value (equal to or larger than −1) whose absolute value increases as the change rate dDEf increases when the change rate dDEf is positive. Conversely, when the change rate dDEf is equal to or smaller than a negative reference set in advance, the basic gain Kfab is calculated as a positive value (equal to or smaller than 1) so as to increase as the change rate dDEf decreases. Further, when the change rate dDEf is larger than the negative reference and equal to or smaller than 0, the basic gain Kfab is calculated so as to decrease as the change rate dDEf increases.

In Step 120, a vehicle speed gain Kvfa for the corrected friction control amount Tfa is calculated as a positive value (equal to or smaller than 1) based on the vehicle speed V so as to increase as the vehicle speed V increases.

In Step 130, a correction gain Kfa for the corrected friction control amount Tfa is calculated as a sum (Kfab·Kvfa+1) of a product of the basic gain Kfab and the vehicle speed gain Kvfa and 1.

Note that, items relating to the calculation in Step 50 to Step 130 are described in International Patent WO2014/087546A.

In Step 140, based on the change rate dDEf of the driving energy after the low-pass filtering, a basic gain Krab for the corrected return control amount Tra is calculated. In this case, the basic gain Krab is calculated as a negative value (equal to or larger than −1) whose absolute value increases as the change rate dDEf increases when the change rate dDEf is positive. Conversely, when the change rate dDEf is equal to or smaller than a negative reference set in advance, the basic gain Krab is calculated as a positive value (equal to or smaller than 1) so as to increase as the change rate dDEf decreases. Further, when the change rate dDEf is larger than the negative reference and equal to or smaller than 0, the basic gain Krab is calculated so as to decrease as the change rate dDEf increases.

Note that, when the change rate dDEf is positive, the basic gains Kdab, Kfab, and Krab may be calculated as negative constant values equal to or larger than −1. Moreover, when the change rate dDEf is equal to or smaller than the negative reference set in advance, the basic gains Kdab, Kfab, and Krab may be calculated as positive constant values equal to or smaller than 1.

In Step 150, the vehicle speed gain Kvra for the corrected return control amount Tra is calculated as a positive constant value (equal to or smaller than 1) independently of the vehicle speed V. Note that, the vehicle speed gain Kvra may be calculated as a positive value (equal to or smaller than 1) so as to slightly increase as the vehicle speed V increases.

In Step 160, a correction gain Kra for the corrected return control amount Tra is calculated as a product Krab·Kvra of the basic gain Krab and the vehicle speed gain Kvra.

Note that, items relating to the calculation in Step 140 to Step 160 are described in Japanese Patent Application Laid-open No. 2014-148178 A filed by the applicant of the present invention.

Returning to FIG. 2, the correction gains Kab, Kda, Kfa, and Kra calculated as described above in the correction gain calculation block 98 are respectively output to the multipliers 78, 82, 88, and 96. An output of the multiplier 78, namely, a signal representing a product Tab·Kab of the basic assist torque Tab and the correction gain Kab, is output to an adder 106.

An output of the multiplier 82, namely, a signal representing a product Tda·Kda of the corrected attenuation control amount Tda and the correction gain Kda, is also output to the adder 106. An output of the adder 106, namely, a signal representing a sum (Tab·Kab+Tda·Kda) of the product Tab·Kab and the product Tda·Kda, is output to an adder 108.

An output of the multiplier 88, namely, a signal representing a product Tfa·Kfa of the corrected friction control amount Tfa and the correction gain Kfa, is also output to the adder 108. An output of the adder 108, namely, a signal representing a sum (Tab·Kab+Tda·Kda+Tfa·Kfa) of the products Tab·Kab, Tda·Kda, and Tfa·Kfa, is output to an adder 110.

An output of the multiplier 96, namely, a signal representing a product Tra·Kra of the corrected return control amount Tra and the correction gain Kra, is also output to the adder 110. An output of the adder 110, namely, a signal representing a sum (Tab·Kab+Tda·Kda30 Tfa·Kfa+Tra·Kra) of the products Tab·Kab, Tda·Kda, Tfa·Kfa, and Tra·Kra, is used as a signal representing the target assist torque Tat for controlling the power steering device 12.

As appreciated from the above description, the target assist torque Tat is calculated as the sum of the basic assist torque (Tab·Kab), the attenuation control amount (Tda·Kda), the friction control amount (Tfa·Kfa), and the return control amount (Tra·Kra) for returning the steering wheel 18 to the neutral position. Then, the gains Kab, Kda, Kfa, and Kra of the respective control amounts are variably controlled based on the change rate dDE of the driving energy in accordance with the flowchart of FIG. 3.

In particular, in Step 20 and Step 30, the change rate dDE of the driving energy is calculated, and, in Step 40, the change rate dDEf of the driving energy with its high frequency noise components removed by the low-pass filtering is calculated. Then, based on the change rate dDEf of the driving energy after the low-pass filtering, the respective basic gains Kabb, Kdab, Kfab, and Krab are calculated in Step 50, Step 80, Step 110, and Step 140, respectively, so that the respective basic gains are variably set depending on the sign and magnitude of the change rate dDEf. Thus, it is possible to vary the amounts of correction to the respective components (the basic assist torque, the attenuation control amount, the friction control amount and the return control amount) of the target assist torque Tat which is the adjustment force.

The torque input to the steering device 16 reverse from the road surface via the steered wheels is generally small, and hence when the change rate dDEf is positive and large, that is, when the change rate dDEf is the change rate of increase and large, a state of the forward input in which the energy is input to the steering device 16 by the steering by the driver is considered to exist.

The control of the respective gains in accordance with the flowchart illustrated in FIG. 3 can increase the basic assist torque Tab, and can decrease the attenuation control amount Tda, the friction control amount Tfa, and the return control amount Tra as the change rate dDEf increases with the change rate dDEf being positive. Thus, in addition to assisting the steering by the driver, the torque of the attenuation control, the torque of the friction control, and the steering resistance caused by the return torque to the neutral position can be decreased, and hence the steering operation by the driver can be facilitated.

Note that, while the steering wheel 18 is controlled to return to the neutral position by the return control amount Tra, when the driver steers toward the neutral position, the change rate dDEf is determined to be positive, and the return control amount Tra is decreased also in that case, resulting in a decrease in the assist torque. Thus, under this state, the return control amount Tra may not be decreased, but rather may be controlled to be the same value as that in the case in which the change rate dDEf is negative or 0, to thereby facilitate the steering toward the neutral position by the driver.

Conversely, when the change rate dDEF is negative, and the absolute value of the change rate dDEF is large, that is, when the change rate dDEf is the change rate of decrease and large in magnitude, the state of the reverse input is considered to exist, in which the energy input by the steering by the driver to the steering device 16 is 0 or small, and the torque input to the steering device 16 from the road surface via the steered wheels is large.

The control of the respective gains in accordance with the flowchart illustrated in FIG. 3 can decrease the basic assist torque Tab, and can increase the attenuation control amount Tda, the friction control amount Tfa, and the return control amount Tra as the absolute value of the change rate dDEf increases with the change rate dDEf being negative. Thus, the steering resistance can be increased without unnecessarily assisting the steering by the driver, and hence a degree of a rotational drive of the steering wheel 18 caused by an interference can be reduced, to thereby increase stability of the steering.

The change rate dDEf of the driving energy contains the P0 term relating to a product of the steering angular velocity and the derivative of the steering angular velocity, and hence the change rate dDEf is relatively greatly changed by the steering even under a state in which the steering wheel 18 is in the neutral area. Thus, compared with determination based on an index value not containing the P0 term, under the state in which the steering wheel is in the neutral area, a change in the steering state can be determined early, to thereby early increase or decrease the basic assist torque Tab and the like.

Figure 8:
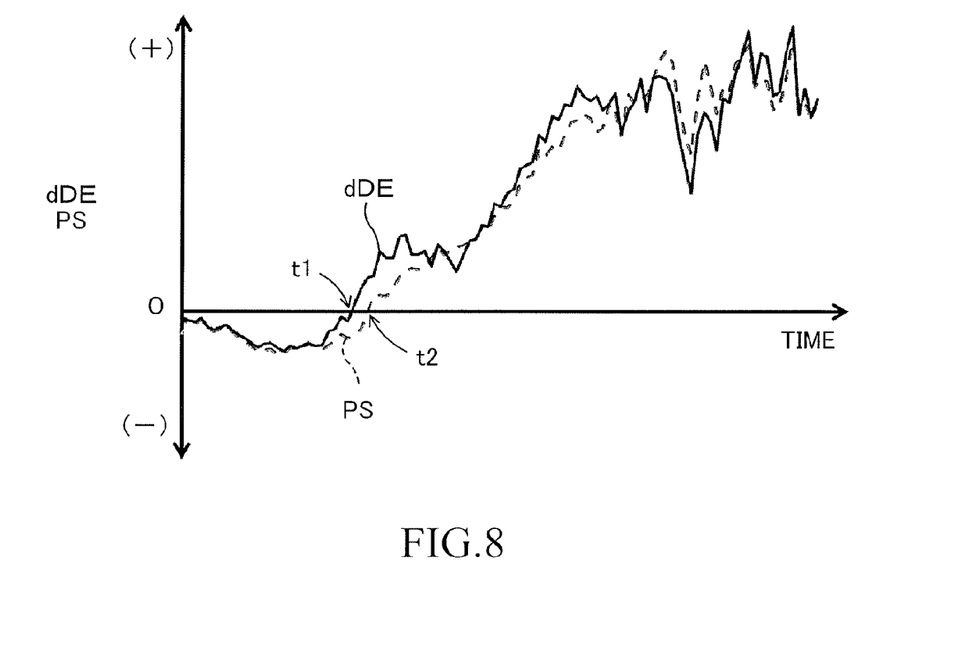
FIG. 8 is a graph for showing an example of changes in the change rate dDE of the driving energy and a power PS described in International Patent WO2014/087546A under a state in which a steering direction is inverted.

For example, FIG. 8 is a graph for showing an example of changes in the change rate dDE of the driving energy and a power PS, which is a sum of the P1 term and the P2 term and described in International Patent WO2014/087546A under a state in which a steering direction is inverted. It is appreciated that the change rate dDE changes from a negative value to a positive value at a time point t1 earlier than a time point t2 at which the power PS changes from a negative value to a positive value.

Figure 9:
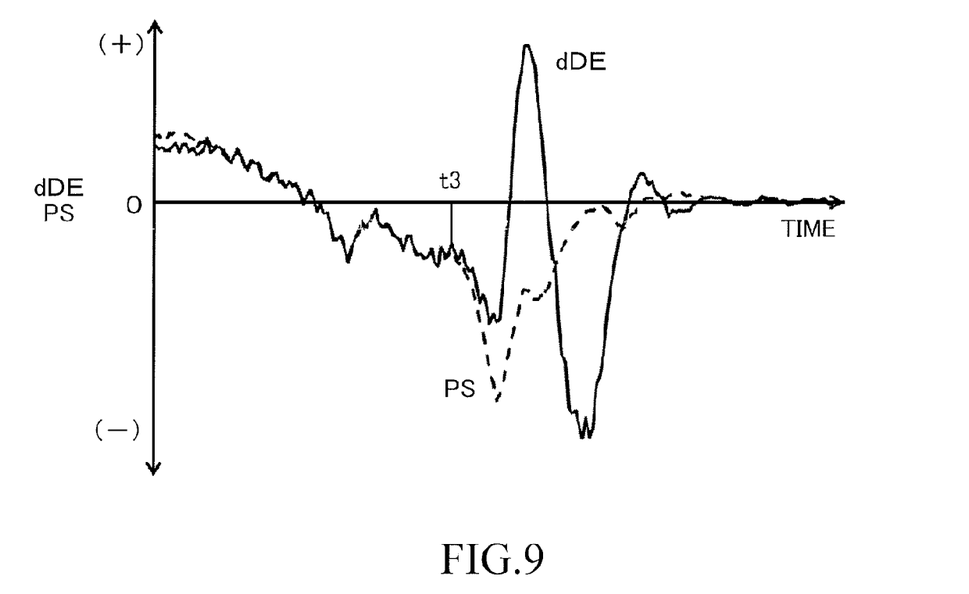
FIG. 9 is a graph for showing an example of changes in the change rate dDE of the driving energy and the power PS described in International Patent WO2014/087546A under a state in which the steering wheel is released in a second half of reciprocating steering.

FIG. 9 is a graph for showing an example of changes in the change rate dDE of the driving energy and the power PS described in International Patent WO2014/087546A under a state in which the steering wheel is released in a second half of reciprocating steering. The power PS transitions while remaining negative after a time point t3 at which the steering wheel is released. On the other hand, the change rate dDE of the driving energy is negative immediately after the time point t3, but then becomes positive for a while, and again becomes negative. This phenomenon is considered to be caused by the fact that the steering wheel 18 rotates immediately after the steering wheel 18 is released to input energy to the steering device 16, the change rate dDE consequently becomes positive for a while, but the change rate dDE becomes negative again as a reaction of this positive input of the energy.

According to the first embodiment, under a state in which the steering wheel 18 is released in the second half of the reciprocating steering, the rotational behavior of the steering wheel 18 can be determined based on the change in the change rate dDE across the negative and positive areas. Thus, without necessity of determining whether or not the steering wheel 18 is released, the increase/decrease control for the basic assist torque Tab and the like can be appropriately carried out depending on the rotational behavior of the steering wheel 18 under the state in which the steering wheel 18 is released.

Further, when the steering wheel 18 is rotated in the same direction by the forward input and the reverse input, the steering torque and the change rate thereof are only small values. Therefore, this state cannot be determined based on the power PS. However, even under this state, the steering wheel rotates, which causes the steering angle θ to change, resulting in relatively large changes in the steering angler velocity dθ and the derivative ddθ thereof. Thus, this state can be determined based on the change rate dDE of the driving energy, and hence even when the forward input and the reverse input to the steering system have the same phase, the increase/decrease control for the basic assist torque Tab and the like can be appropriately carried out depending on the change rate dDE. The above-described effects can be attained in a second embodiment described later.

[Second Embodiment]

Figure 4:
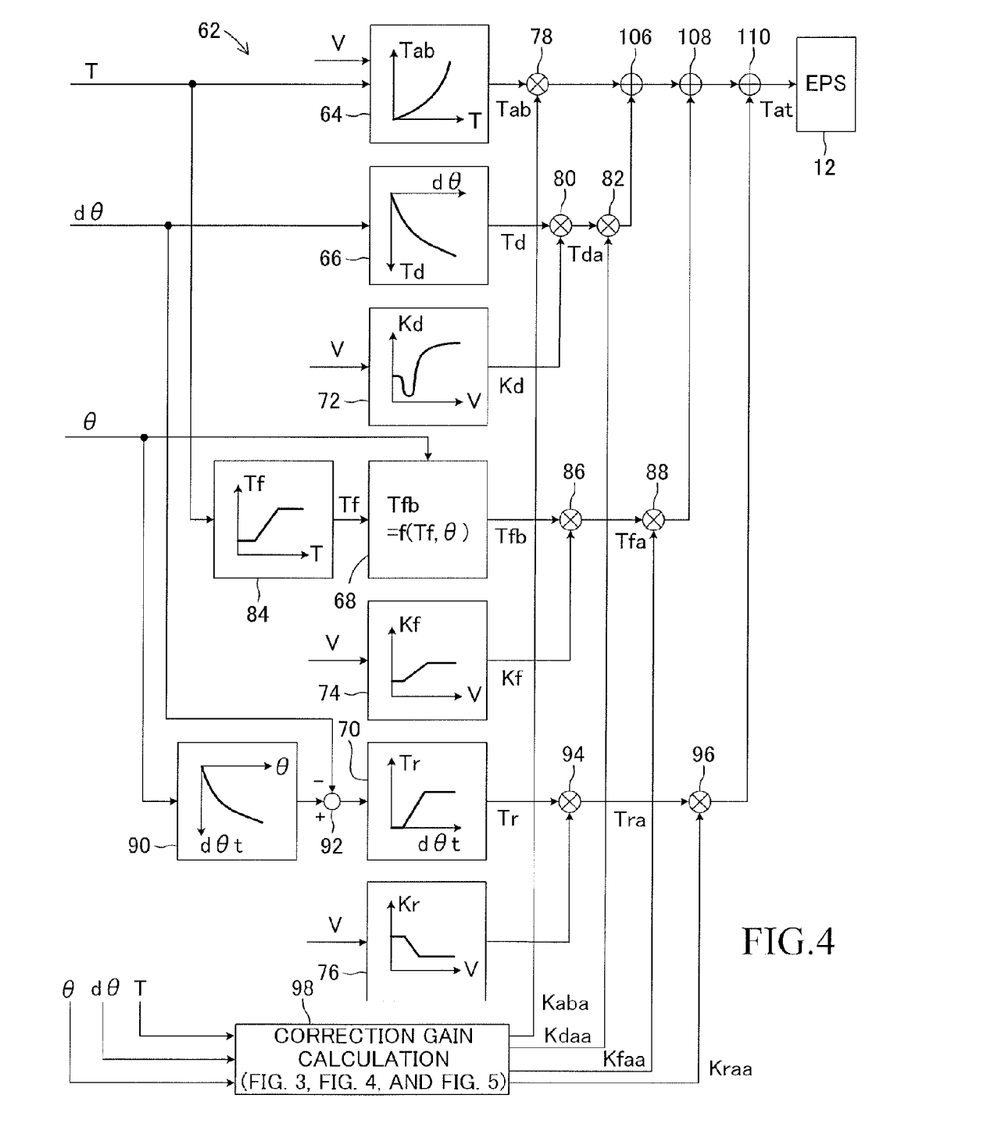
FIG. 4 is a block diagram of an assist torque calculation device configured to calculate the assist torque Ta of a steering assist apparatus for a vehicle according to a second embodiment of the present invention.

FIG. 4 is a block diagram of an assist torque calculation device 62 configured to calculate the assist torque Ta of a steering assist apparatus 10 for a vehicle according to a second embodiment of the present invention. Note that, in FIG. 4, the same parts as those illustrated in FIG. 2 are denoted by the same reference numerals as those of FIG. 2.

In the first embodiment, when the torque of the reverse input is large, the reverse input is determined, and the control for the assist torque depending on the reverse input can be carried out. However, even when the reverse input occurs, when the torque thereof is small, the reverse input cannot be determined, and hence the control for the assist torque depending on the reverse input cannot be carried out.

In the second embodiment, as an index value Iin for determining whether the input to the steering device 16 is a forward input or a reverse input, a product dT·dDE of a product dT·T of the steering torque T and the derivative thereof dT and the change rate of the driving energy dDE is calculated. When the input is a forward input, the product dT·T changes in the same phase as the change rate dDE of the driving energy, but when the input is a reverse input, the product dT·T changes in the opposite phase of the change rate dDE of the driving energy. Thus, the index value Iin is an index value representing a ratio of the forward input and the reverse input to the overall input to the steering device 16. As the ratio of the forward input to the overall input increases, the index value Iin increases with the index value Iin being positive. On the other hand, as the ratio of the reverse input to the overall input increases, the absolute value of the index value Iin increases with the index value Iin being negative.

Figure 10:
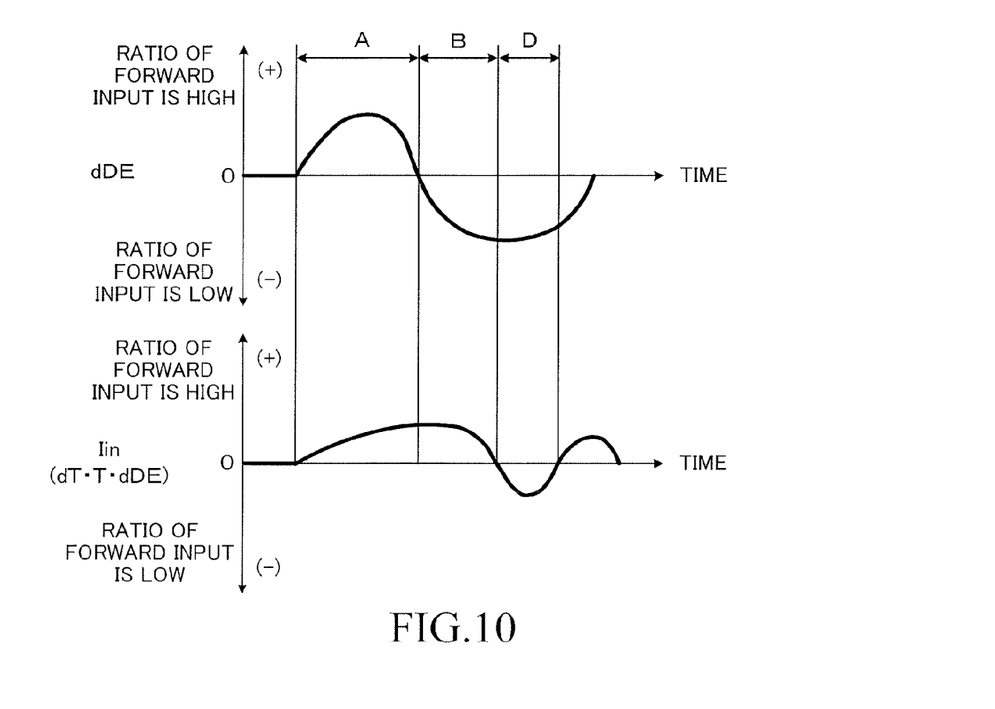
FIG. 10 is a graph for showing an example of changes in the change rate dDE (upper part) of the driving energy and in an index value Iin (lower part).
Figure 11:
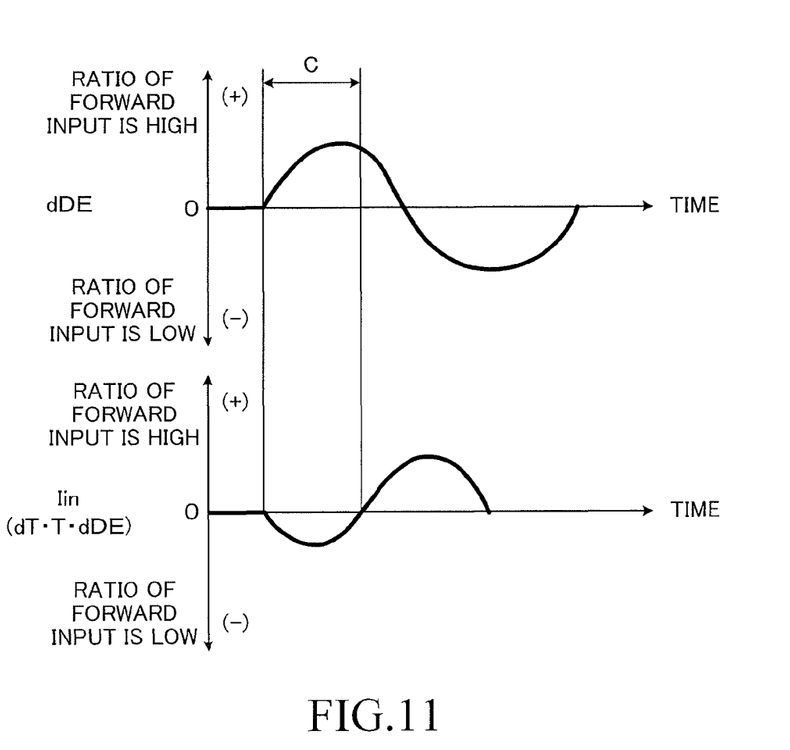
FIG. 11 is a graph for showing another example of the changes in the change rate dDE (upper part) of the driving energy and in the index value Iin (lower part).

For example, such a case is considered in which under a state in which the change rate dDE of the driving energy changes as shown in the upper parts of FIG. 10 and FIG. 11, the index value Iin changes as shown in the lower parts of FIG. 10 and FIG. 11.

In an area A, both the change rate dDE and the index value Iin are positive. In an area B, the change rate dDE is negative, and the index value Iin is positive. In an area C, the change rate dDE is positive, and the index value Iin is negative. In an area D, both the change rate dDE and the index value Iin are negative.

In the areas A to D, a characteristic that the steering device 16 is required to have is shown in Table 1. The area A is an area in which priority should be given to steering responsiveness, while the area B is an area in which priority should be given to steering stability. The area C is an area in which priority given to steering responsiveness needs to be reduced compared to in the area A. The area D is an area in which priority given to steering stability needs to be increased compared to in the area C. Moreover, a common required characteristic in the areas A and B is a steering characteristic matching a steering operation by the driver. A common required characteristic in the areas C and D is a characteristic of reducing a load on the driver caused by an interference.

TABLE 1

|  | Ratio of forward input is high (Iin > 0) | Ratio of reverse input is high (Iin < 0) |
| --- | --- | --- |
| Ratio of forward input is high (dDE > 0) | A<br>Priority on responsiveness | C<br>Priority on responsiveness (corrected) |
| Ratio of forward input is low (dDE ≤ 0) | B<br>Priority on stability | D<br>More priority on stability |

In this embodiment, the blocks other than the correction gain calculation block 98 of the assist torque calculation device 62 function in the same manner as the corresponding blocks of the first embodiment. The correction gain calculation block 98 follows the flowcharts illustrated in FIG. 3, FIG. 5, and FIG. 6 to calculate the correction gains Kaba, Kdaa, Kfaa, and Kraa respectively for the basic assist torque Tab, the corrected attenuation control amount Tda, the corrected friction control amount Tfa, and the corrected return control amount Tra. The correction gains Kaba, Kdaa, Kfaa, and Kraa are respectively output to the multipliers 78, 82, 88, and 96.

Figure 5:
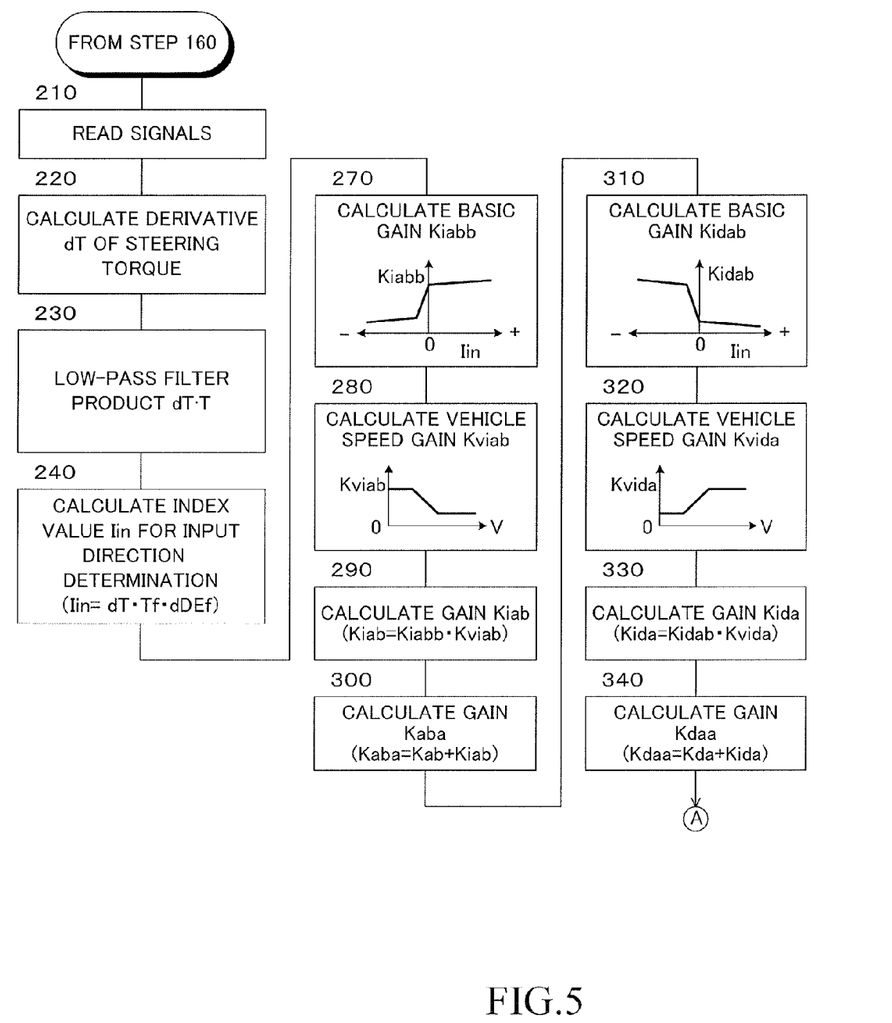
FIG. 5 is a flowchart (first half) for illustrating calculation of the correction gain by the correction gain calculation block according to the second embodiment.
Figure 6:
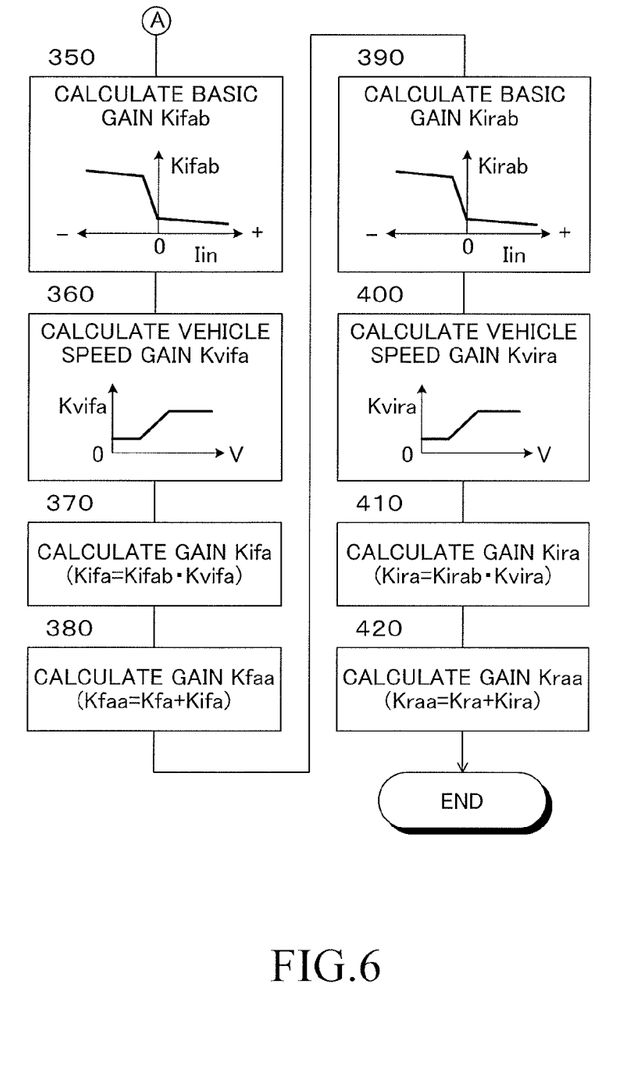
FIG. 6 is a flowchart (second half) for illustrating calculation of the correction gain by the correction gain calculation block according to the second embodiment.

Step 10 to Step 160 of the flowchart illustrated in FIG. 3 are carried out as in the first embodiment, and Step 210 to Step 420 of flowcharts illustrated in FIG. 5 and FIG. 6 are carried out subsequently to Step 160.

In Step 210, the signal representing the steering torque T detected by the steering torque sensor 54 and the like are read. In Step 220, the derivative dT of the steering torque T is calculated.

In Step 230, the product dT·T of the steering torque T and the derivative dT thereof is calculated, and the product dT·T is low-pass filtered to calculate a product dT·Tf after low-pass filtering.

In Step 240, the index value Iin for input direction determination is calculated as a product dt·Tf·dDEf of the product dt·Tf after the low-pass filtering and the change rate dDEf of the driving energy after the low-pass filtering.

In Step 270, based on the index value Iin for input direction determination, a basic gain Kiabb for the basic assist torque Tab is calculated. In this case, the basic gain Kiabb is calculated as a positive value (equal to or smaller than 1) so as to increase as the index value Iin increases when the index value Iin is positive. Conversely, when the index value Iin is equal to or smaller than a negative reference set in advance, the basic gain Kiabb is calculated as a positive value (value close to 0) whose absolute value decreases as the index value Iin decreases. Further, when the index value Iin is larger than the negative reference and equal to or smaller than 0, the basic gain Kiabb is calculated so as to increase as the index value Iin increases.

Note that, when the index value Iin is positive, the basic gain Kiabb may be calculated as a positive constant value equal to or smaller than 1. Moreover, when the index value in is equal to or smaller than the negative reference set in advance, the basic gain Kiabb may be calculated as a positive constant value close to 0.

In Step 280, a vehicle speed gain Kviab for the basic assist torque Tab is calculated as a positive value (equal to or smaller than 1) based on the vehicle speed V so as to decrease as the vehicle speed V increases.

In Step 290, a correction gain Kiab for the basic assist torque Tab is calculated as a product (Kiabb·Kviab) of the basic gain Kiabb and the vehicle speed gain Kviab.

In Step 300, the corrected correction gain Kaba for the basic assist torque Tab is calculated as a sum (Kab+Kiab) of the correction gain Kab calculated in Step 70 and the correction gain Kiab calculated in Step 290.

In Step 310, based on the index value Iin for input direction determination, a basic gain Kidab for the corrected attenuation control amount Tda is calculated. In this case, the basic gain Kidab is calculated as a positive value (close to 1) so as to decrease as the index value Iin increases when the index value Iin is positive. Conversely, when the index value Iin is equal to or smaller than a negative reference set in advance, the basic gain Kidab is calculated as a positive value (equal to or smaller than 1) so as to increase as the index value Iin decreases. Further, when the index value Iin is larger than the negative reference and equal to or smaller than 0, the basic gain Kidab is calculated so as to decrease as the index value Iin increases.

In Step 320, a vehicle speed gain Kvida for the corrected attenuation control amount Tda is calculated as a positive value (equal to or smaller than 1) based on the vehicle speed V so as to increase as the vehicle speed V increases.

In Step 330, the correction gain Kida for the corrected attenuation control amount Tda is calculated as a product (Kidab·Kvida) of the basic gain Kidab and the vehicle speed gain Kvida.

In Step 340, the corrected correction gain Kdaa for the corrected attenuation control amount Tda is calculated as a sum (Kda+Kida) of the correction gain Kda calculated in Step 100 and the correction gain Kida calculated in Step 330.

In Step 350, based on the index value Iin for input direction determination, a basic gain Kifab for the corrected friction control amount Tfa is calculated. In this case, the basic gain Kifab is calculated as a positive value (close to 0) so as to decrease as the index value Iin increases when the index value Iin is positive. Conversely, when the index value Iin is equal to or smaller than a negative reference set in advance, the basic gain Kifab is calculated as a positive value (equal to or smaller than 1) so as to increase as the index value Iin decreases. Further, when the index value Iin is larger than the negative reference and equal to or smaller than 0, the basic gain Kifab is calculated so as to decrease as the index value Iin increases.

In Step 360, a vehicle speed gain Kvifa for the corrected friction control amount Tfa is calculated as a positive value (equal to or smaller than 1) based on the vehicle speed V so as to increase as the vehicle speed V increases.

In Step 370, a correction gain Kifa for the corrected friction control amount Tfa is calculated as a product (Kifab·Kvifa) of the basic gain Kifab and the vehicle speed gain Kvifa.

In Step 380, the corrected correction gain Kfaa for the corrected friction control amount Tfa is calculated as a sum (Kfa+Kifa) of the correction gain Kfa calculated in Step 130 and the correction gain Kifa calculated in Step 370.

In Step 390, based on the index value Iin for input direction determination, a basic gain Kirab for the corrected return control amount Tra is calculated. In this case, the basic gain Kirab is calculated as a positive value (close to 0) so as to decrease as the index value Iin increases when the index value Iin is positive. Conversely, when the index value Iin is smaller than a negative reference set in advance, the basic gain Kirab is calculated as a positive value (equal to or smaller than 1) so as to increase as the index value Iin decreases. Further, when the index value Iin is larger than the negative reference and equal to or smaller than 0, the basic gain Kirab is calculated so as to decrease as the index value Iin increases.

In Step 400, a vehicle speed gain Kvira for the corrected return control amount Tra is calculated as a positive value (equal to or smaller than 1) based on the vehicle speed V so as to increase as the vehicle speed V increases.

In Step 410, a correction gain Kira for the corrected return control amount Tra is calculated as a product (Kirab·Kvira) of the basic gain Kirab and the vehicle speed gain Kvira.

In Step 420, the corrected correction gain Kraa for the corrected return control amount Tra is calculated as a sum (Kra+Kira) of the correction gain Kra calculated in Step 160 and the correction gain Kira calculated in Step 410.

Note that, when the index value Iin is positive, the basic gains Kidab, Kifab, and Kirab may be calculated as positive constant values close to 0. Moreover, when the reference Iin is smaller than the negative reference set in advance, the basic gains Kidab, Kifab, and Kirab may be calculated as positive constant values equal to or smaller than 1.

As appreciated from the above description, according to the second embodiment, the index value Iin for determining whether the input to the steering device 16 is a forward input or a reverse input is calculated. Then, the correction gains Kab, Kda, Kfa, and Kra are variably controlled depending not only on the change rate dDEf of the driving energy as in the first embodiment, but also on the index value Iin. Thus, as shown in Table 1, one of the areas A to D is determined depending on the signs of the change rate dDEf and the index value Iin, and the assist torque Ta can be controlled to achieve a characteristic appropriate for the one of the areas.

That is, according to the second embodiment, the basic assist torque and the like can be controlled in magnitude based on both the determination result of input state through the change rate dDEf of the driving energy and the determination result of input state through the index value Iin. Thus, compared to the first embodiment in which the basic assist torque and the like are controlled in magnitude based on only the determination result of input state through the change rate dDEf of the driving energy, the basic assist torque and the like can more preferably be controlled depending on the actual input state.

In particular, in the areas A, the basic assist torque (Tab·Kab) is increased in magnitude so as to attain a characteristic in which priority is given on the responsiveness of steering by the driver. In the areas B, the attenuation control amount (Tda·Kda), the friction control amount (Tfa·Kfa), and the return control amount (Tra·Kra) are increased in magnitude so as to attain a characteristic in which a degree of a rotational drive of the steering wheel 18 caused by an interference is reduced, to thereby increase stability of the steering. In the areas C, the amounts of increasing correction to the basic assist torque is reduced compared with that in the area A so to avoid excessive responsiveness of steering by the driver. In the areas D, the amounts of increasing correction to the attenuation control amount, the friction control amount and the return control amount are further increased in magnitude compared with those in the area B so as to attain a characteristic in which further priority is given on the stability of the steering.

Furthermore, according to the second embodiment, the index value Iin is calculated as the product dT·T·dDE of the product dT·T of the steering torque T and the derivative thereof dT and the change rate dDE of the driving energy. Thus, the change rate dDE of the driving energy and the steering torque T and the derivative dT of the steering torque used for the calculation thereof can be used to determine whether the state in which the energy is input to the steering system is the forward input or the reverse input. Moreover, special devices for determining the input direction, such as two torque sensors, are not necessary.

The specific embodiments of the present invention are described in detail above. However, the present invention is not limited to the above-mentioned embodiments. It is apparent for those skilled in the art that various other embodiments may be employed within the scope of the present invention.

For example, in the above-mentioned respective embodiments, the change rate of the energy of the steering system is the derivative dDE of the driving energy DE, which is the energy of the steering system, but the change rate may be a difference (time derivative) of the driving energy DE calculated at every predetermined period.

Moreover, in the respective embodiments, the target assist torque Tat is calculated as the sum of the basic assist torque (Tab·Kab), the attenuation control amount (Tda·Kda), the friction control amount (Tfa·Kfa), and the return control amount (Tra·Kra) for returning the steering wheel 18 to the neutral position. However, at least one of the attenuation control amount, the friction control amount, and the return control amount may be corrected so as not to be corrected depending on the change rate dDEf of the driving energy DE.

Moreover, in the second embodiment, as the index value Iin for determining whether the input to the steering device 16 is a forward input or a reverse input, the product dT·T·dDE of the product dT·T of the steering torque T and the derivative thereof dT and the change rate of the driving energy dDE is calculated. However, the determination of the input direction may be carried out by other means.

Figure 12:
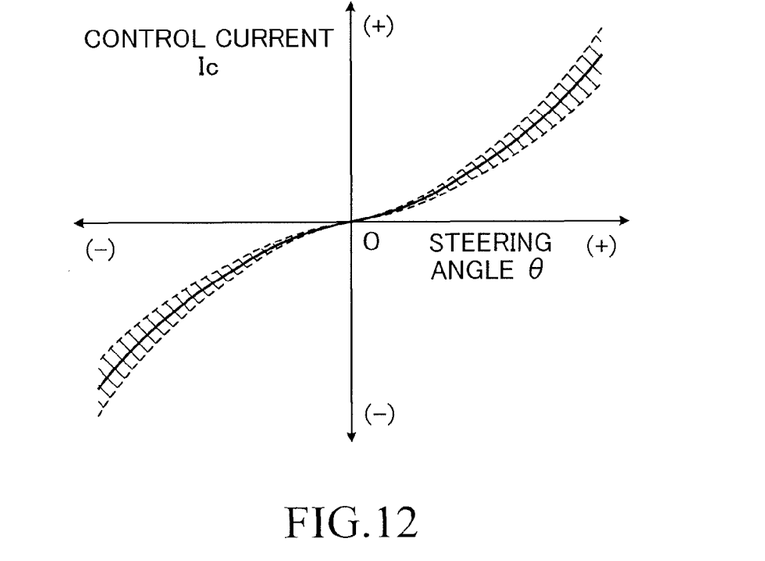
FIG. 12 is a graph for showing a relationship between a steering angle θ and a control current Ic for the electric power steering device and a permissible range thereof at a certain vehicle speed.

For example, it is assumed that a relationship between the steering angle θ and the control current Ic for the electric power steering device 12 at a certain vehicle speed is the relationship represented by the solid line of FIG. 12, and a permissible range thereof is represented by the hatched area of FIG. 12. When the relationship between the steering angle θ and the control current Ic is in the hatched area, the state may be determined to be the forward input state (reverse input is small). When the relationship between the steering angle θ and the control current Ic is outside the hatched area, the state may be determined to be the reverse input state.

Moreover, for example, two torque sensors may be provided at locations separated in an extension direction of the upper steering shaft 24, and whether the input to the steering device 16 is the forward input or the reverse input may be determined based on a phase difference between detected values of the two torque sensors.

Further, a change rate of the power PS described in International Patent WO2014/087546A may be represented as dPS, and the input direction may be determined based on the sign of a product dT·T·dPS of the product of the steering torque T and the derivative dT thereof, and the change rate dPS of the power PS. Note that, the index value Iin has a larger variation range than the product dT·T·dPS, and hence the input direction can also be appropriately determined based on the index value Iin particularly when the vehicle is traveling on a rough road in which the input direction frequently changes.

What is claimed is:

1. A steering assist apparatus for a vehicle, which is to be applied to the vehicle comprising a steering device,
the steering device comprising:
a steering wheel to be operated by a driver;
steered wheels; and
a transmission device configured to transmit a force and a displacement relating to steering between the steering wheel and the steered wheel,
the steering assist apparatus comprising:
an adjustment force applying device configured to apply an adjustment force for adjusting a force relating to the steering to the transmission device;
a control device configured to control the adjustment force to be applied by the adjustment force applying device to the transmission device;
a steering angle detection device configured to detect a steering angle; and
a steering torque detection device configured to detect a steering torque,
wherein the control device is configured to acquire a steering angular velocity, a derivative of the steering angular velocity, and a derivative of the steering torque, calculate, assuming the steering wheel, the transmission device, the adjustment force applying device, and the steered wheel as a steering system, a change rate of an energy of the steering system based on a product of the steering angular velocity and the derivative of the steering angular velocity, a product of the steering angular velocity and the steering torque, and a product of the steering angle and the derivative of the steering torque, and control the adjustment force based on the change rate of the energy of the steering system.

2. A steering assist apparatus for a vehicle according to claim 1, wherein the control device is configured to calculate, as the change rate of the energy of the steering system, a derivative of a sum of a product of a yaw moment of inertia that is based on a mass of a movable member constructing the steering system and including at least the steering wheel, the steering angular velocity, and the derivative of the steering angular velocity, the product of the steering angular velocity and the steering torque, and the product of the steering angle and the derivative of the steering torque.

3. A steering assist apparatus for a vehicle according to claim 1,
wherein:
the adjustment force comprises a steering assist force; and
the control device is configured to increase, when the change rate of the energy of the steering system is an increasing change rate, the steering assist force compared with a case in which the change rate of the energy of the steering system is not the increasing change rate.

4. A steering assist apparatus for a vehicle according to claim 3, wherein the control device may be configured to determine whether a state in which the energy is input to the steering system is a state of a forward input by steering by a driver or a state of a reverse input by reception of a force by the steered wheel from a road surface, and change an amount of correction to the steering assist force so that an amount of correction to the steering assist force in a state of a reverse input is smaller in magnitude than an amount of correction to the steering assist force in a state of a forward input.

5. A steering assist apparatus for a vehicle according to claim 4, wherein the control device is configured to determine, based on a product of the steering torque, the derivative of the steering torque, and the change rate of the energy of the steering system, whether the state in which the energy is input to the steering system is the state of the forward input by the steering by the driver or the state of the reverse input by the reception of the force by the steered wheel from the road surface.

6. A steering assist apparatus for a vehicle according to claim 1,
wherein:
the adjustment force comprises at least one of a steering attenuation force or a steering friction force; and
the control device is configured to increase, when the change rate of the energy of the steering system is a decreasing change rate, at least one of the steering attenuation force or the steering friction force compared with a case in which the change rate of the energy of the steering system is not the decreasing change rate.

7. A steering assist apparatus for a vehicle according to claim 6, wherein the control device is configured to determine whether a state in which the energy is input to the steering system is a state of a forward input by steering by a driver or a state of a reverse input by reception of a force by the steered wheel from a road surface, and change an amount of correction to at least one of the steering attenuation force or the steering friction force so that an amount of correction to at least one of the steering attenuation force or the steering friction force in a state of a reverse input is larger in magnitude than an amount of correction to at least one of the
steering attenuation force or the steering friction force in a state of a forward input.

8. A steering assist apparatus for a vehicle according to claim 7, wherein the control device is configured to determine, based on a product of the steering torque, the derivative of the steering torque, and the change rate of the energy of the steering system, whether the state in which the energy is input to the steering system is the state of the forward input by the steering by the driver or the state of the reverse input by the reception of the force by the steered wheel from the road surface.

* * * * *